United States Patent
Surendran et al.

(10) Patent No.: US 12,466,497 B2
(45) Date of Patent: Nov. 11, 2025

(54) TRACTOR, COMMERCIAL VEHICLE, RANGE OF TRACTORS AND METHOD FOR CONFIGURING A TRACTOR

(71) Applicant: Volvo Truck Corporation, Gothenburg (SE)

(72) Inventors: Sanal Surendran, Karnataka (IN); Bharath Kumar A, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 419 days.

(21) Appl. No.: 18/093,419

(22) Filed: Jan. 5, 2023

(65) Prior Publication Data

US 2023/0257036 A1  Aug. 17, 2023

(30) Foreign Application Priority Data

Feb. 16, 2022 (EP) ..................................... 22156949

(51) Int. Cl.
*B62D 35/00* (2006.01)
*B62D 49/00* (2006.01)
*B62D 53/08* (2006.01)

(52) U.S. Cl.
CPC ............ *B62D 35/001* (2013.01); *B62D 49/00* (2013.01); *B62D 53/08* (2013.01)

(58) Field of Classification Search
CPC ...... B62D 35/001; B62D 49/00; B62D 53/08; B62D 25/168; B62D 25/182; B62D 35/008
See application file for complete search history.

(56) References Cited

U.S. PATENT DOCUMENTS

2019/0084622 A1\*  3/2019  MacNeil .............. B62D 25/161

FOREIGN PATENT DOCUMENTS

| CA | 3042104 A1 \* | 11/2019 | ........... B62D 35/001 |
| DE | 9115125 U1 | 3/1992 | |
| DE | 102005021517 A1 | 12/2005 | |
| EP | 2981452 A1 | 2/2016 | |
| WO | 2018136826 A1 | 7/2018 | |

OTHER PUBLICATIONS

CN 107953932 A (Year: 2018).\*
Extended European Search Report for European Patent Application No. 22156949.4, mailed Aug. 5, 2022, 8 pages.
Examination Report for European Patent Application No. 22156949.4, mailed Apr. 29, 2025, 7 pages.

\* cited by examiner

*Primary Examiner* — Lori Lyjak
(74) *Attorney, Agent, or Firm* — Withrow & Terranova, PLLC

(57) ABSTRACT

A tractor of a commercial vehicle comprising lateral fairings each having a fixed portion attached to a chassis, a movable portion, and a mounting arrangement to vary a fairing height of the movable portion in accordance with a fifth-wheel height of a fifth-wheel coupling, wherein the mounting arrangement is chosen between a discontinuous mounting arrangement comprising a first mounting member and a series of second mounting members, the series of second mounting members comprising separate second members aligned at different mounting heights, and a continuous mounting arrangement comprising a pinion and a rack configured to cooperate with each other to move the movable portion with respect to the fixed portion within a range of mounting heights when the pinion is driven in rotation.

9 Claims, 8 Drawing Sheets

TRACTOR, COMMERCIAL VEHICLE, RANGE OF TRACTORS AND METHOD FOR CONFIGURING A TRACTOR

RELATED APPLICATIONS

The present application claims priority to European Patent Application No. 22156949.4, filed on Feb. 16, 2022, and entitled "TRACTOR, COMMERCIAL VEHICLE, RANGE OF TRACTORS AND METHOD FOR CONFIGURING A TRACTOR," which is incorporated herein by reference in its entirety.

TECHNICAL FIELD

This disclosure pertains to the field of tractors of commercial vehicles and more specifically to aerodynamic performance of such tractors.

BACKGROUND ART

There is both a market and regulatory push to improve fuel efficiency of the commercial vehicles, such as trucks. One of the direct contributors to improve fuel efficiency is by enhancing aerodynamic performance.

Commercial vehicles generally comprise a tractor to which a trailer may be removably attached through a fifth-wheel coupling. One classification of the fifth-wheel couplings is their overall fifth-wheel height from a top surface of a rear chassis part of a chassis on which they are arranged.

With increasing fifth-wheel height of the fifth-wheel couplings, an upper gap between the top surface of the rear chassis part and the trailer in a vertical direction increases as well, resulting in a loss of aerodynamic performance.

To cover this upper gap, it is known to mount extensions on lateral fairings covering respectively outer lateral surfaces of the rear chassis part and configured to fill at least a part of a lower gap between wheel trains in the vertical direction.

Currently, the extensions are offered with only one fairing height chosen with respect to aerodynamic performance of the highest fifth-wheel coupling. This creates an imbalance in aerodynamic performance when these common extensions are implemented in commercial vehicles presenting other fifth-wheel heights and hence other dimensions of the upper gap. In addition, there exists a possibility of damages of the extensions and/or the trailer for lower fifth-wheel heights.

SUMMARY

This disclosure improves the situation.

According to an aspect, it is proposed a tractor of a commercial vehicle comprising:
- a chassis extending along a longitudinal direction, the chassis having front and rear chassis parts adjoining each other along the longitudinal direction, the rear chassis part presenting opposite outer lateral surfaces, parallel to each other, and a top surface between the outer lateral surfaces,
- a cab with a driving place for a driver mounted on the front chassis part,
- at least two wheel trains at a distance from each other along the longitudinal direction and on which the chassis is mounted,
- a fifth-wheel coupling arranged on the top surface of the rear chassis part and configured to attach a trailer to the tractor, the fifth-wheel coupling protruding from the top surface of the rear chassis part up to a fifth-wheel height,
- lateral fairings covering respectively the outer lateral surfaces of the rear chassis part and configured to fill at least a part of a lower gap between the wheel trains in a vertical direction, wherein each of the lateral fairings has:
  - a fixed portion attached to the chassis,
  - a movable portion presenting an upper free edge almost parallel to the top surface of the rear chassis part, and
  - a mounting arrangement between the fixed portion and the movable portion, the mounting arrangement being configured to vary a fairing height of the upper free edge of the movable portion with respect to the top surface of the rear chassis part in accordance with the fifth-wheel height, wherein the mounting arrangement is chosen between:
    - a discontinuous mounting arrangement configured to move in a discontinuous manner the movable portion with respect to the fixed portion between different mounting heights, the discontinuous mounting arrangement comprising at least one first mounting member arranged on one of the fixed and movable portions, and at least one series of second mounting members arranged on the other of the fixed and movable portions, the series of second mounting members comprising separate second members aligned at different mounting heights, the first mounting member being configured to cooperate with any of the second mounting members to attach the movable portion to the fixed portion,
    - a continuous mounting arrangement configured to move in a continuous manner the movable portion with respect to the fixed portion within a range of mounting heights, the continuous mounting arrangement comprising a blocking arrangement having an blocking state in which said blocking arrangement prevents the movable portion to move with respect to the fixed portion and a moving state in which said blocking arrangement allows the movable portion to move with respect to the fixed portion.

Thanks to the invention, the mounting height of the movable portion and hence the fairing height of its upper free edge can be adjusted depending on the fifth-wheel height of the tractor.

Such provisions improve the aerodynamic performance of each commercial vehicle by enabling the upper gap between the tractor and the trailer to be appropriately filled.

The first and second mounting members of the discontinuous mounting arrangement may be conformed as male and female mounting members, the male mounting member being configured to be inserted in the female mounting member to attach the movable portion to the fixed portion of each of the lateral fairings.

The blocking arrangement of the continuous mounting arrangement may comprise at least one pinion mounted on one of the fixed and movable portions, and at least one rack mounted on the other of the fixed and movable portions, the pinion and the rack presenting respective contact surfaces configured to cooperate with each other to move the movable portion with respect to the fixed portion within the range of mounting heights when the pinion is driven in rotation in the moving state, and to maintain the movable portion in position with respect to the fixed portion when the pinion is not driven in rotation in the blocking state.

The contact surfaces of the pinion and the rack of the continuous mounting arrangement may be conformed as complementary toothed surfaces.

Alternatively, the movable portion may be slidably mounted on the fixed portion, the blocking arrangement of the continuous mounting arrangement comprising an urging device configured to urge the movable portion against the fixed portion in the blocking state, and to be spaced apart from the movable portion in the moving state.

In another aspect, it is proposed a commercial vehicle comprising a tractor as defined previously, and a trailer, wherein the upper free edge of the movable portion of each of the lateral fairings is arranged at the fairing height with respect to the top surface of the rear chassis part in accordance with the fifth-wheel height through the mounting arrangement, so as to fill at least a part of an upper gap between the top surface of the rear chassis part and the trailer in a vertical direction.

In another aspect, it is proposed a range of tractors as defined previously, comprising at least two tractors with respective fifth-wheel couplings protruding from the top surfaces of the respective rear chassis parts up to different fifth-wheel heights, and wherein for each of the tractors, the upper free edge of the movable portion of each lateral fairing is arranged at the fairing height with respect to the top surface of the rear chassis part in accordance with the fifth-wheel height through the mounting arrangement.

In another aspect, it is proposed a method for configuring a tractor as defined previously, comprising the steps of moving the movable portion of each of the lateral fairings with respect to the fixed portion through the mounting arrangement to arrange the upper free edge of the movable portion at the fairing height with respect to the top surface of the rear chassis part in accordance with the fifth-wheel height.

BRIEF DESCRIPTION OF DRAWINGS

Other features, details and advantages will be shown in the following detailed description and on the figures, on which.

DESCRIPTION OF EMBODIMENTS

In the Figures, the same reference numbers refer to the same or similar elements.

Figure 1:
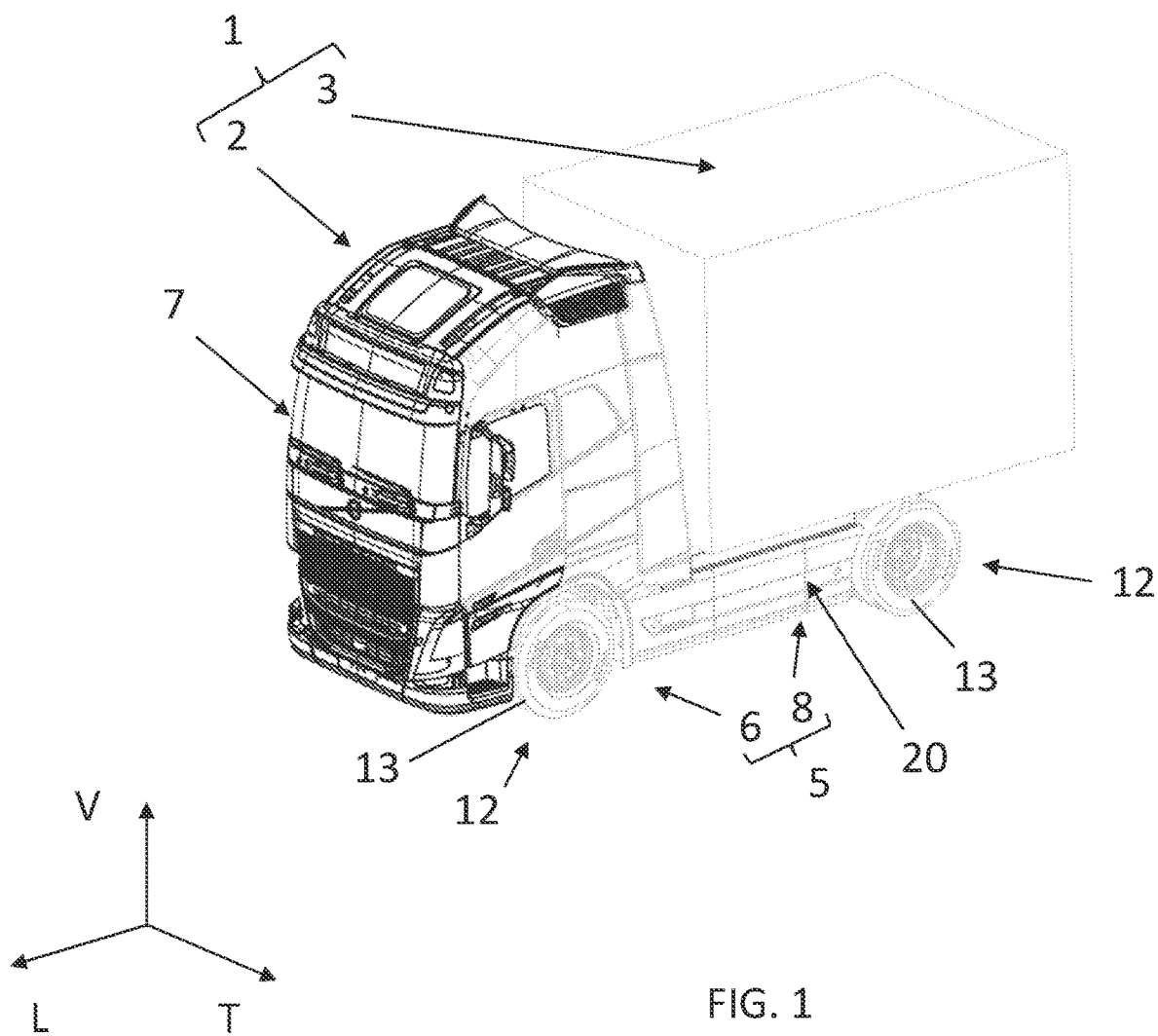
FIGS. 1 and 2 are representations in perspective and in elevation of a first commercial vehicle of a range of commercial vehicles, the commercial vehicle comprising a tractor and a trailer attached to a fifth-wheel coupling of the tractor, the fifth-wheel coupling protruding from the top surface of the rear chassis part up to a fifth-wheel height, the tractor having lateral fairings covering respectively outer lateral surfaces of rear chassis part and having each a fixed portion, a movable portion and a mounting arrangement configured to vary a fairing height of an upper free edge of the movable portion with respect to a top surface of a rear chassis part of the tractor in accordance with the fifth-wheel height and a lower edge of the trailer, so as to so as to fill an upper gap between the top surface of the rear chassis part and the trailer in a vertical direction.
Figure 2:
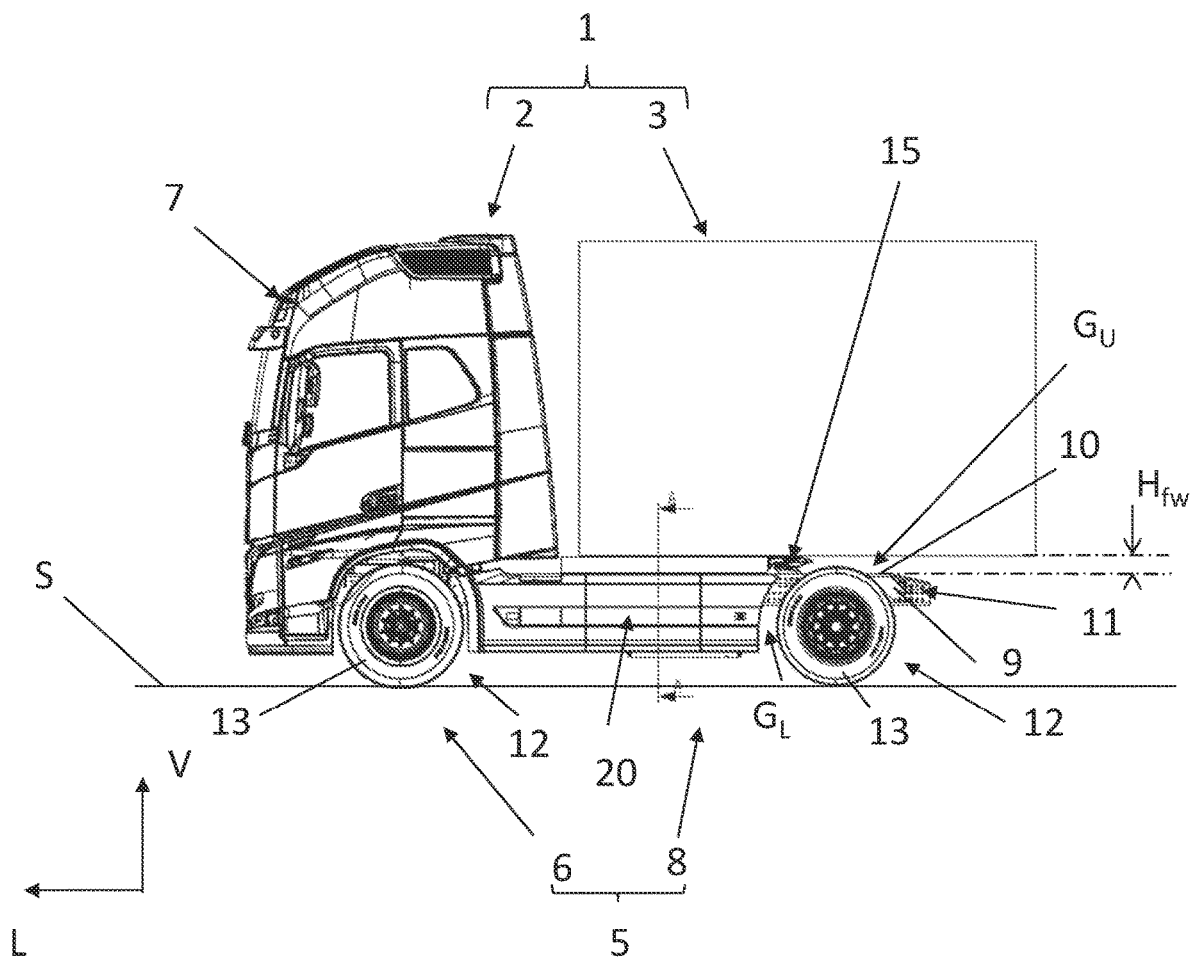

FIGS. 1 and 2 represent a first commercial vehicle 1 of a range of commercial vehicles. The range of commercial vehicles comprises several commercial vehicles combining different kinds of tractor 2 and different kinds of trailer 3 configured so that the trailer 3 of any kind can be attached in a removable manner to the tractor 2 of any kind.

The tractor 2 of the first commercial vehicle 1 comprises a chassis 5 extending along a longitudinal direction L corresponding to a direction along which the tractor 2 moves forward or rearward on a ground surface S. The chassis 5 has a front chassis part 6 receiving a cab 7 with a driving place for a driver. The chassis 5 also has a rear chassis part 8 adjoining the front chassis part 6 along the longitudinal direction L. The rear chassis part 8 presents opposite outer lateral surfaces 9, parallel to each other, and a top surface 10 between the outer lateral surfaces 9. The rear chassis part 8 is generally formed by two beams 11 parallel to each other along the longitudinal direction L and connected to each other by traverses extending in a transverse direction T, perpendicular to the longitudinal direction L. The chassis 5 rests on the ground surface S through wheel trains 12 each comprising wheels 13 at ends of a shaft driven in rotation by a driving system. In the figures, two wheel trains 12 are spaced apart from each other along the longitudinal direction L.

To removably attach the trailer 3 to the tractor 2, a fifth-wheel coupling 15 is provided on the top surface 10 of the rear chassis part 8. The fifth-wheel coupling 15 protrudes from the top surface 10 of the rear chassis part 8 up to a fifth-wheel height $H_{fw}$ which results in an upper gap $G_u$ between the top surface 10 of the rear chassis part 8 and a lower edge of the trailer 3 in a vertical direction V, perpendicular to the longitudinal L and transverse T directions.

For aerodynamics considerations, the tractor 2 has lateral fairings 20 covering respectively the outer lateral surfaces 9 of the rear chassis part 8. Each of the lateral fairings 20 comprises a fixed portion 21 attached to the chassis 5 and configured to fill at least a part of the lower gap $G_L$ and possibly a part of the upper gap $G_U$, and a movable portion 22 configured to fill at least a part of the upper gap $G_U$.

More specifically, the movable portion 22 is conformed as an extension plate 23 presenting an upper free edge 24 almost parallel, i.e. with an inclination less than 10°, to the top surface 10 of the rear chassis part 8. Each of the lateral fairings 20 has a mounting arrangement 25 between the fixed portion 21 and the movable portion 22 which is configured to vary a fairing height $H_f$ of the upper free edge 24 of the movable portion 22 in the vertical direction V with respect to the top surface 10 of the rear chassis part 8 in accordance with the fifth-wheel height $H_{fw}$.

Figure 3:
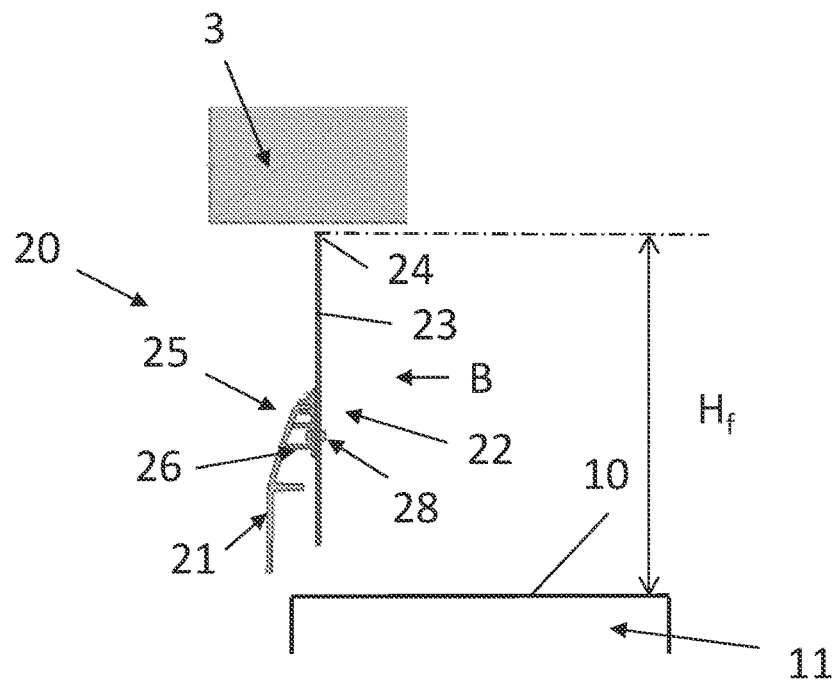
FIG. 3 is a representation in section along orientation A-A on FIG. 2 of one of the lateral fairings of the tractor according to a first embodiment of the mounting arrangement, the mounting arrangement being a discontinuous mounting arrangement configured to move in a discontinuous manner the movable portion with respect to the fixed portion between different mounting heights.
Figure 4:
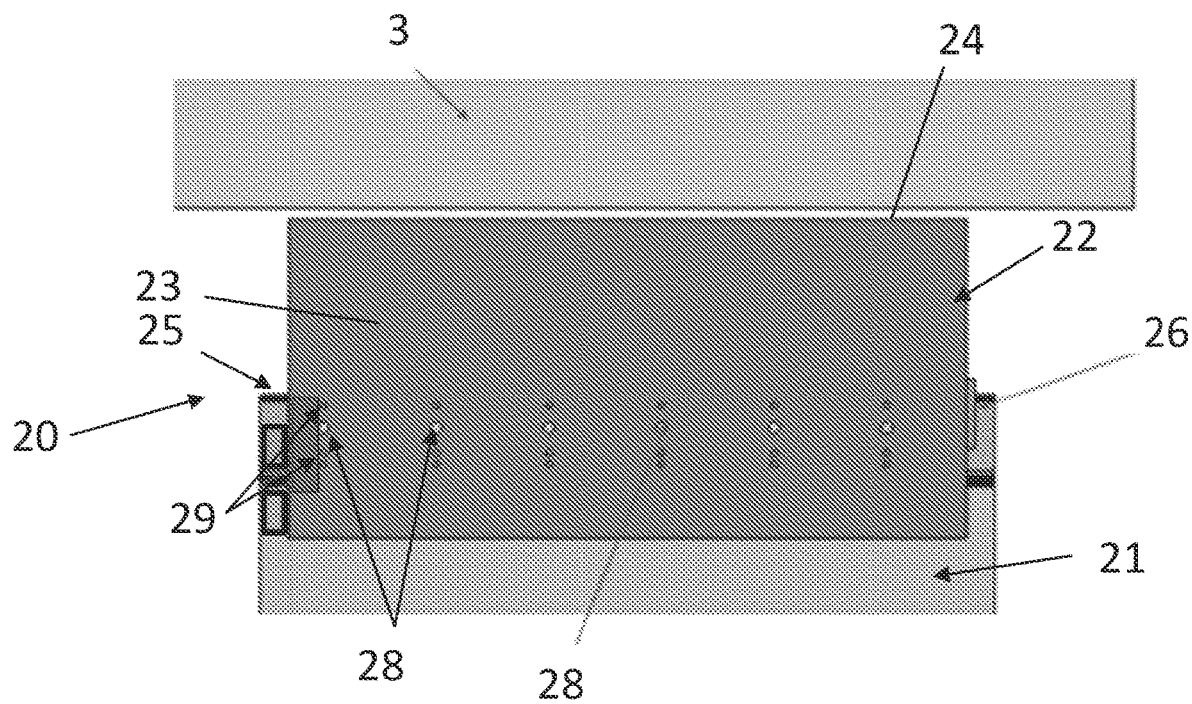
FIG. 4 is a representation of a view along orientation B on FIG. 3 of the lateral fairing of FIG. 3

FIGS. 3 and 4 show a first embodiment of the mounting arrangement 25 configured as a discontinuous mounting arrangement 25 by which the movable portion 22 is moved in a discontinuous manner with respect to the fixed portion 21 between different mounting heights.

The discontinuous mounting arrangement 25 comprises at least one first mounting member arranged on one of the fixed 21 and movable 22 portions, and at least one series of second mounting members arranged on the other of the fixed 21 and movable 22 portions. The series of second mounting members comprises separate second members aligned at different mounting heights. The first mounting member is configured to cooperate with any of the second mounting members to attach the movable portion 22 to the fixed portion 21.

For example, as represented, the first and second mounting members of the discontinuous mounting arrangement 25 can be conformed as male and female mounting members. The fixed portion comprises a base 26 configured to receive the extension plate 23 of the movable portion 22. In FIG. 3, the base 26 has a vertical receiving surface provided with at least one hole configured to receive the male mounting member configured as an elongate fastening member 28 such as a rivet, a screw, a nut-bolt, a clip, etc. The female mounting member is configured as a hole 29 of a series of holes 29 aligned in the vertical direction V on the extension plate 23 of the movable portion 22. The extension plate 23 of the movable portion 22 is urged against the vertical receiving surface of the base 26 of the fixed portion 21 with one of its holes 29 in correspondence with the hole of the base 26 of the fixed portion 21, in accordance with the required mounting height. The elongate fastening member 28 can then be inserted in the holes in correspondence of the extension plate 23 of the movable portion 22 and the base 26 of the fixed portion 21, so as to attach the movable portion 22 to the fixed portion 21.

As shown in FIG. 4, assemblies of first mounting members and series of second mounting members are distributed along a length in the longitudinal direction L of the lateral fairing 20 to ensure stability of the mounting arrangement 25.

Figure 5:
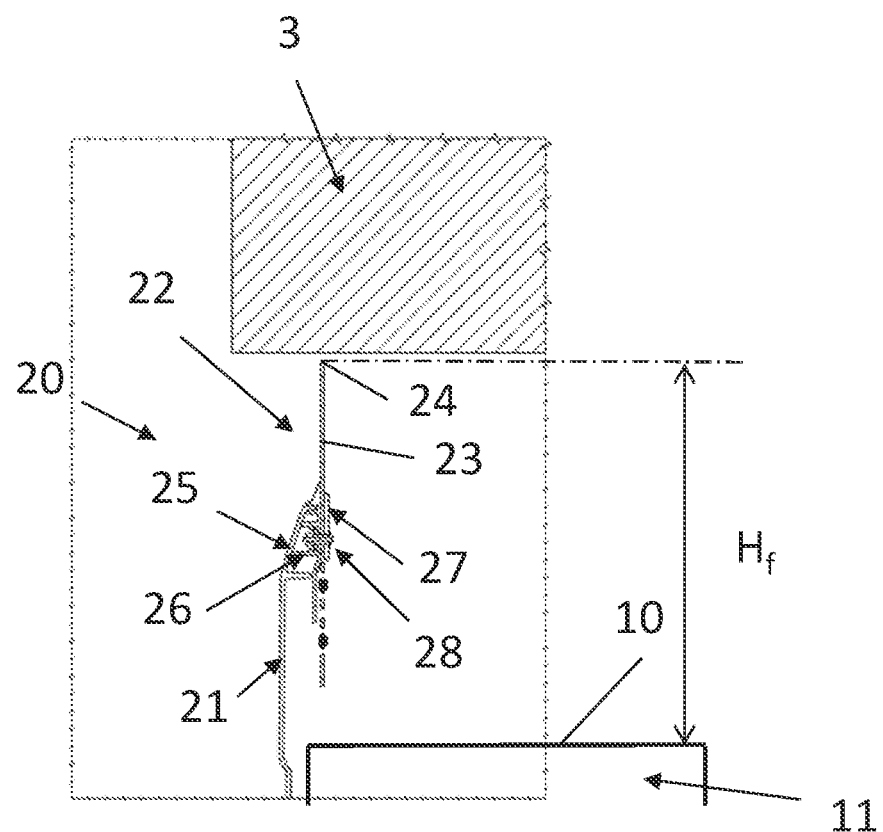
FIG. 5 is a representation in section along orientation A-A on FIG. 2 of one of the lateral fairings of the tractor according to a variant of the first embodiment of the mounting arrangement.

Alternatively, as shown in a variant of FIG. 5, the fixed portion 21 of the discontinuous mounting arrangement 25 comprises a support 27 with holes in addition to the base 26, the support 27 being configured so that the extension plate 23 of the movable portion 22 is sandwiched between the base 26 and the support 27. The elongate fastening members 28 can then be inserted in the holes in correspondence of the extension plate 23 of the movable portion 22 and of the base 26 and the support 27 of the fixed portion 21, so as to attach the movable portion 22 to the fixed portion 21.

Figure 6:
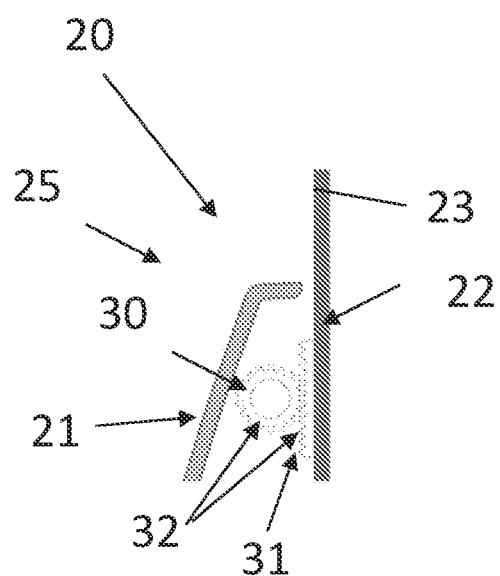
FIG. 6 is a schematic representation in section along orientation A-A on FIG. 2 of one of the lateral fairings of the tractor according to a second embodiment of the mounting arrangement, the mounting arrangement being a continuous mounting arrangement configured to move in a continuous manner the movable portion with respect to the fixed portion within a range of mounting heights through a pinion and rack arrangement.
Figure 7:
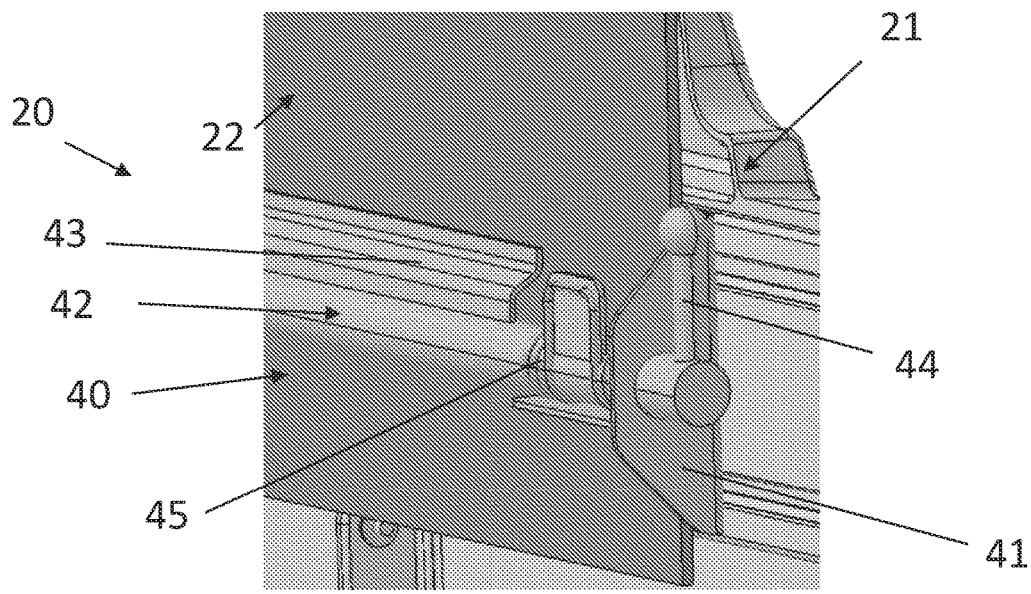
FIGS. 7 to 9 are representations of one of the lateral fairings of the tractor according to a variant of the second embodiment of the mounting arrangement, the continuous mounting arrangement comprising an urging device configured to urge the movable portion against the fixed portion in a blocking state shown in FIG. 8, and to be spaced apart from the movable portion in a moving state shown in FIG. 9, FIGS. 10 and 11 are representations in perspective and in elevation of a second commercial vehicle of the range of commercial vehicles, the second commercial vehicle presenting a fifth-wheel height superior to the fifth-wheel height of the first commercial vehicle, the movable portion of the lateral fairing filling the upper gap between the top surface of the rear chassis part and the trailer in the vertical direction.

FIGS. 6 and 7 show a second embodiment of the mounting arrangement 25 configured as a continuous mounting arrangement 25 by which the movable portion 22 is moved in a continuous manner with respect to the fixed portion 21 within a range of mounting heights.

The continuous mounting arrangement 25 comprises a blocking arrangement having a blocking state in which it prevents the movable portion 22 to move with respect to the fixed portion 21 and a moving state in which it allows the movable portion 22 to move with respect to the fixed portion 21.

In FIG. 6, the blocking arrangement of the continuous mounting arrangement comprises at least one pinion 30 mounted on one of the fixed 21 and movable 22 portions, and at least one rack 31 mounted on the other of the fixed 21 and movable 22 portions. The pinion 30 and the rack 31 present respective contact surfaces, for example conformed as complementary toothed surfaces 32 in the represented embodiment, configured to cooperate with each other to move the movable portion 22 with respect to the fixed portion 21 within the range of mounting heights when the pinion 30 is driven in rotation in the moving state, and to maintain the movable portion 22 in position with respect to the fixed portion 21 when the pinion 30 is not driven in rotation in the blocking state.

For example, the pinion 30 may be pivotally mounted in any suitable manner to the fixed portion 21 of the lateral fairing 20, and the rack 31 may extend in the vertical direction V on the extension plate 23 of the movable portion 22. The pinion 30 can be connected to an actuator, manual or motorized, to be driven in rotation so as to move the extension plate 23 up and down within the range of mounting heights in accordance with the fifth-wheel height $H_{fw}$.

Figure 8:
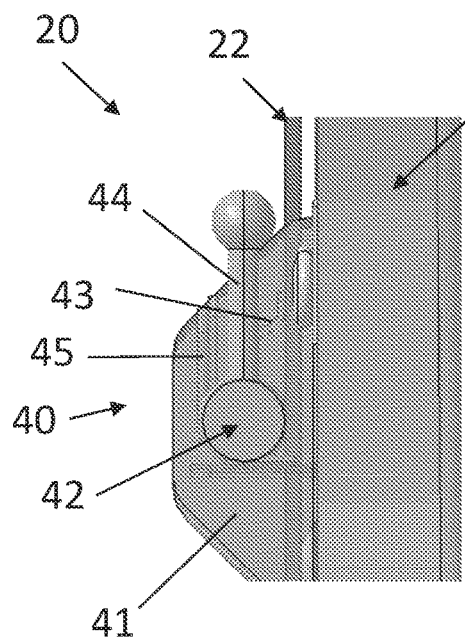
Figure 9:
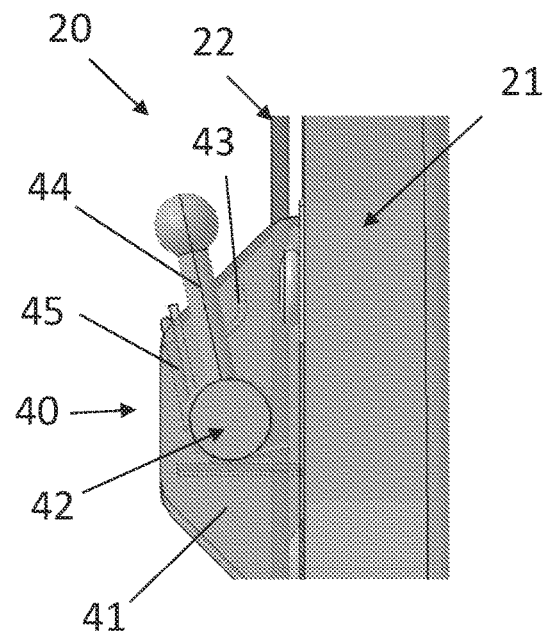

Alternatively, as shown in a variant of FIGS. 7 to 9, the movable portion 22 is slidably mounted on the fixed portion 21. The blocking arrangement of the continuous mounting arrangement 25 comprises an urging device 40 configured to urge the movable portion 22 against the fixed portion 21 in the blocking state (FIG. 8), and to be spaced apart from the movable portion 22 in the moving state (FIG. 9).

More specifically, the urging device 40 comprises a shaft 42 pivotally mounted on the fixed portion 21 through a mounting bracket 41. A lever 44 is connected to an end of the shaft 42 so as to move the shaft 42 in rotation upon actuation of the lever 44. The shaft 42 comprises a plate 43 extending radially from an outer surface. The urging device 40 also comprises a torsion spring 45 arranged so that, in the blocking state of the continuous mounting arrangement 25, shown in FIG. 8, it urges the plate 43 against the movable portion 22 so as to hold it in position. In FIG. 9, to adjust the height of the movable portion 22, the shaft 42 is rotated by actuating the lever 44 so as to disengage the plate 43 from the movable portion 22 against an elastic urging force of the torsion spring 45. The movable portion 22 then becomes loose and can be set to the required height. Once it is done, the lever 44 can be released so that the shaft 42 and the plate 43 are returned to their position to block the movable portion 22.

Thanks to the mounting arrangement 25, the mounting height of the movable portion 22 of the lateral fairing 20 may be adjusted, thereby adjusting the fairing height $H_f$ of the upper free edge 24 of the movable portion 22 according to the fifth-wheel height $H_{fw}$ and/or the lower edge of the trailer 3 to fill at least partly the upper gap $G_U$.

This is particularly advantageous in the range of tractors where at least two tractors 2 or more have fifth-wheel couplings 15 protruding from the top surfaces 10 of the respective rear chassis parts 8 up to different fifth-wheel heights $H_{fw}$.

Figure 10:
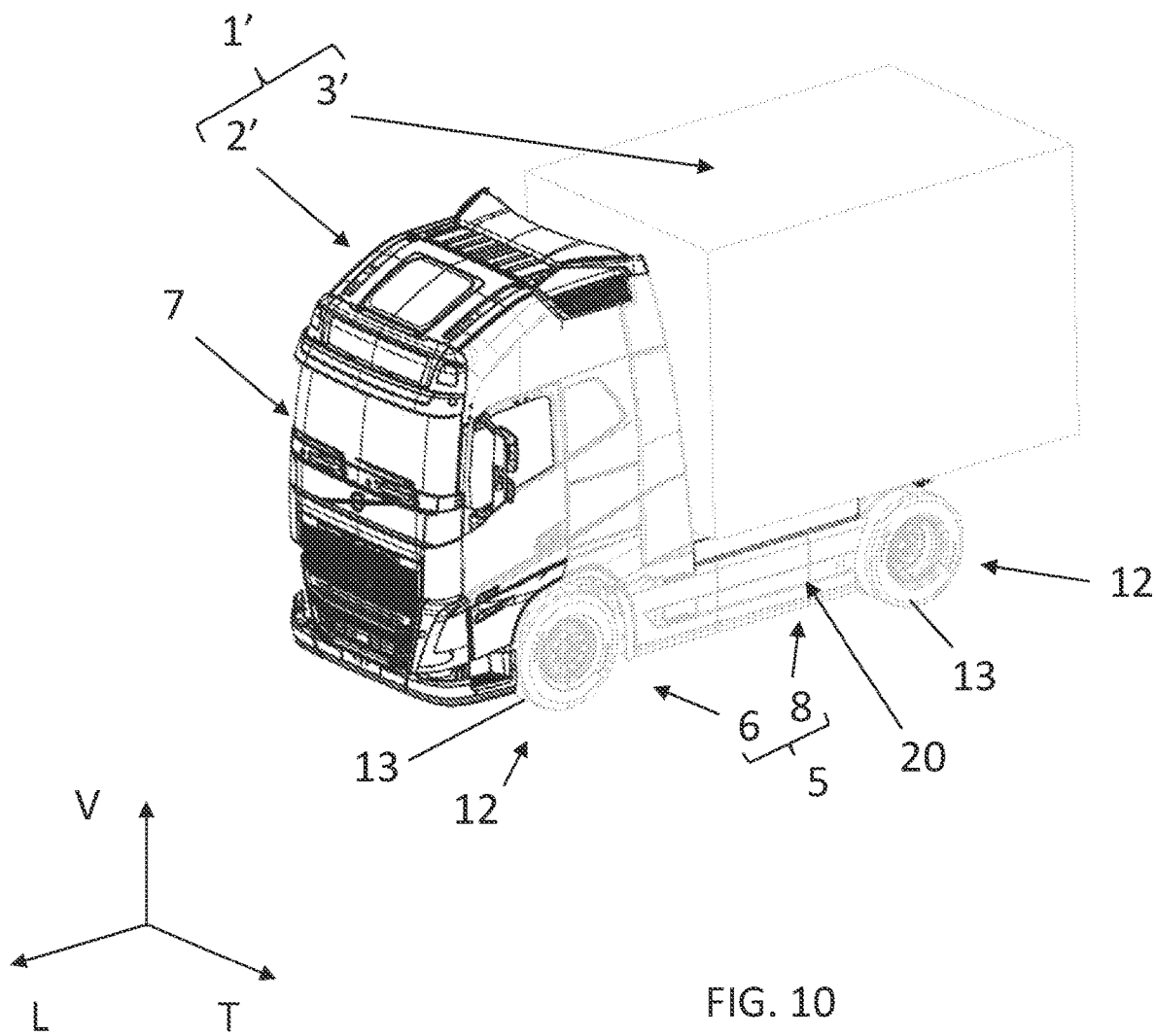
Figure 11:
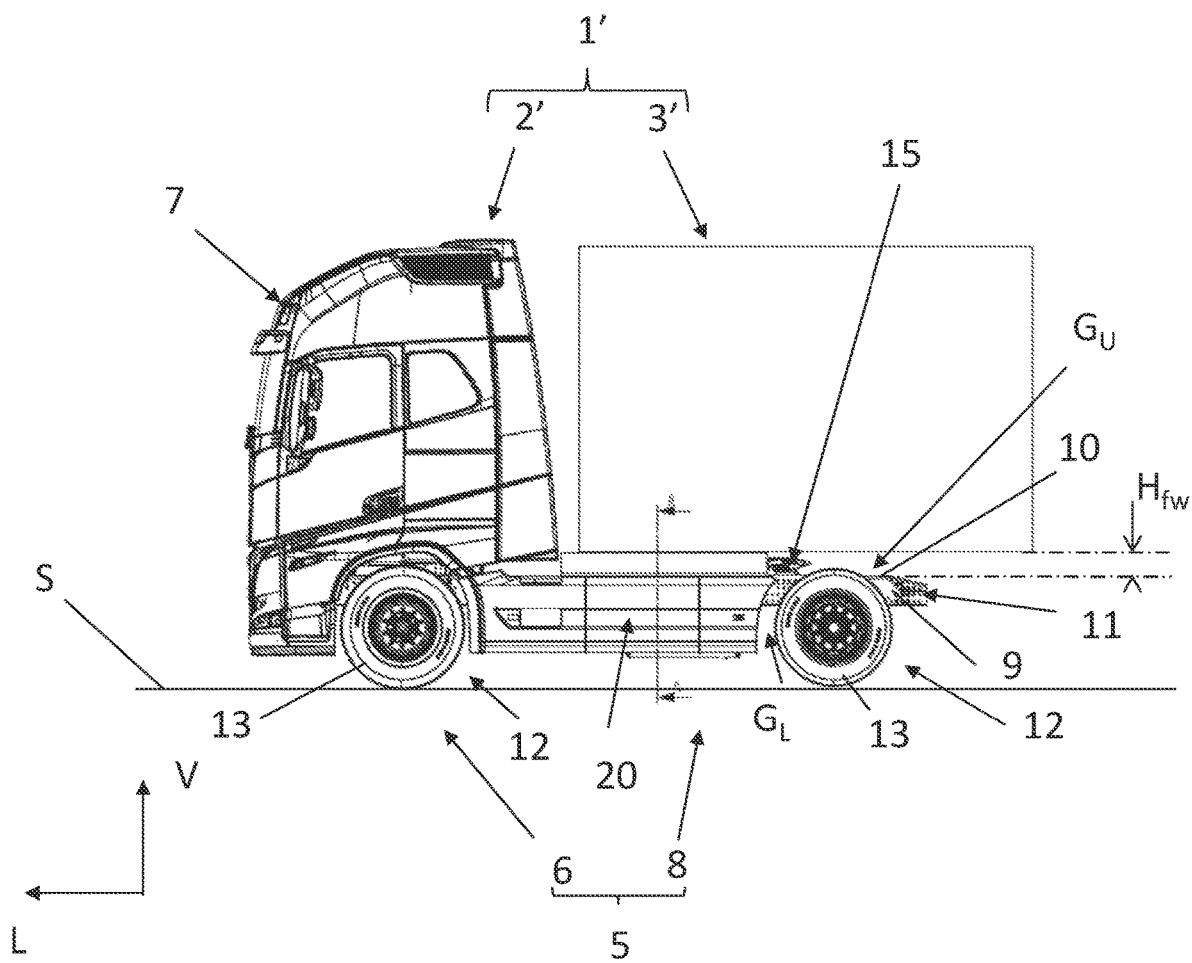
Figure 12:
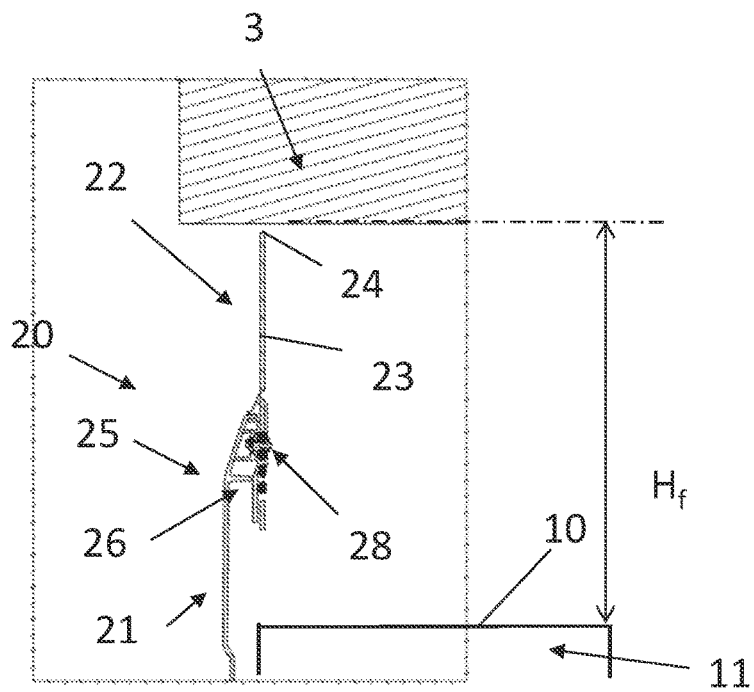
FIG. 12 is a representation in section along orientation A-A on FIG. 11 of one of the lateral fairings of the tractor, showing the discontinuous mounting arrangement setting the mounting height of the movable portion higher than the mounting height of the movable portion of the lateral fairing of the first commercial vehicle, so that the fairing height of the upper free edge of the movable portion corresponds to the fifth-wheel height of the second commercial vehicle.

In this respect, FIGS. 10 and 11 represent a second commercial vehicle 1' of the range of commercial vehicles. The second commercial vehicle combines a tractor 2' and a trailer 3' such that the fifth-wheel height $H_{fw}$ of the second commercial vehicle 1' is superior to the fifth-wheel height fifth-wheel height $H_{fw}$ of the first commercial vehicle 1 shown in FIGS. 1 and 2. As shown in FIG. 12, the mounting arrangement 25 sets the mounting height of the movable portion 22 higher than the mounting height of the movable portion 22 of the lateral fairing 20 of the first commercial vehicle 1, so that the fairing height $H_f$ of the upper free edge 24 of the movable portion 22 corresponds to the fifth-wheel height $H_{fw}$ of the second commercial vehicle 1'.

Figure 13:
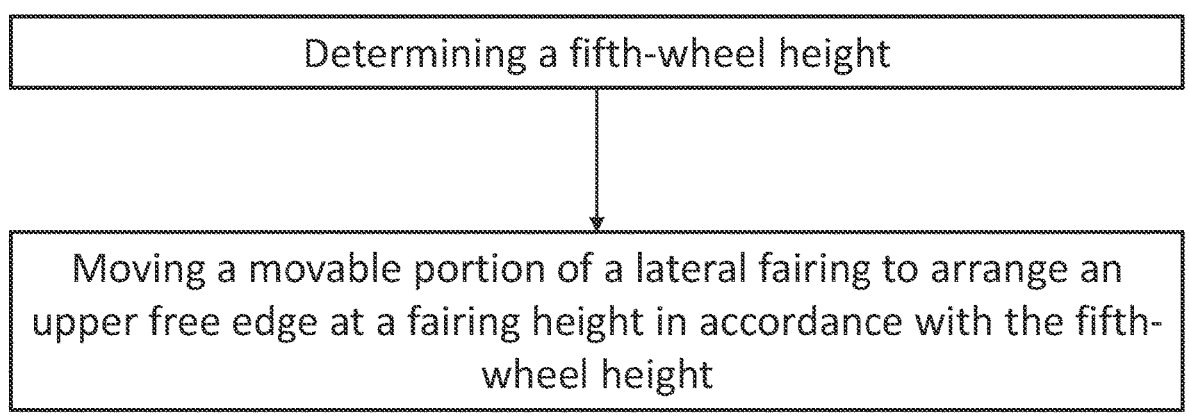
FIG. 13 is a flowchart illustrating steps of a method for configuring a tractor.

In relation with FIG. 13, a method for configuring any of the tractors 2, 2' of the range of commercial vehicles 1, 1' is disclosed. It is first determined the fifth-wheel height $H_{fw}$ of the tractor 2, 2'. Second, the movable portion 22 of each of the lateral fairings 20 is moved with respect to the fixed portion 21 through the mounting arrangement 25 to arrange the upper free edge 24 of the movable portion 22 at the fairing height $H_f$ with respect to the top surface 10 of the rear chassis part 8 in accordance with the fifth-wheel height $H_{fw}$ and/or the lower edge of the trailer.

The invention claimed is:

1. A tractor of a commercial vehicle comprising:
   a chassis extending along a longitudinal direction, the chassis having front and rear chassis parts adjoining each other along the longitudinal direction, the rear chassis part presenting opposite outer lateral surfaces, parallel to each other, and a top surface between the outer lateral surfaces,
   a cab with a driving place for a driver mounted on the front chassis part,
   at least two wheel trains at a distance from each other along the longitudinal direction and on which the chassis is mounted,
   a fifth-wheel coupling arranged on the top surface of the rear chassis part and configured to attach a trailer to the tractor, the fifth-wheel coupling protruding from the top surface of the rear chassis part up to a fifth-wheel height,
   lateral fairings covering respectively the outer lateral surfaces of the rear chassis part and configured to fill at least a part of a lower gap between the wheel trains in a vertical direction,
   wherein each of the lateral fairings has:
      a fixed portion attached to the chassis and comprising a base and a support, in addition to the base and having holes,
      a movable portion comprising an extension plate presenting an upper free edge almost parallel to the top surface of the rear chassis part, and
      a mounting arrangement between the fixed portion and the movable portion, the mounting arrangement being configured to vary a fairing height of the upper free edge of the movable portion with respect to the top surface of the rear chassis part in accordance with the fifth-wheel height,
   wherein the mounting arrangement is a discontinuous mounting arrangement configured to move the movable portion in a discontinuous manner with respect to the fixed portion between different mounting heights, the discontinuous mounting arrangement comprising at least one first mounting member arranged on one of the fixed and movable portions, and at least one series of second mounting members arranged on the other of the fixed and the movable portions, the series of second mounting members comprising separate second members aligned at different mounting heights, the first mounting member being configured to cooperate with any of the second mounting members to attach the movable portion to the fixed portion,
   wherein the extension plate of the movable portion is sandwiched between the base and the support.

2. The tractor of claim 1, wherein the first and the second mounting members of the discontinuous mounting arrangement are conformed as male and female mounting members, the male mounting member being configured to be inserted in the female mounting member to attach the movable portion to the fixed portion of each of the lateral fairings.

3. The tractor of claim 2, wherein the male mounting member is configured as an elongate fastening member.

4. The tractor of claim 2, wherein the female mounting member is configured as a hole of a series of holes aligned in the vertical direction on the extension plate of the movable portion.

5. The tractor of claim 1, comprising assemblies of first mounting members and series of second mounting members being distributed along a length in the longitudinal direction of the lateral fairing to ensure stability of the mounting arrangement.

6. A commercial vehicle comprising the tractor of claim 1, and a trailer, wherein the upper free edge of the movable portion of each of the lateral fairings is arranged at the fairing height with respect to the top surface of the rear chassis part in accordance with the fifth-wheel height through the mounting arrangement, so as to fill at least a part of an upper gap between the top surface of the rear chassis part and the trailer in a vertical direction.

7. A range of tractors comprising at least two tractors according to claim 1 with respective fifth-wheel couplings protruding from the top surfaces of the respective rear chassis parts up to different fifth-wheel heights, and wherein for each of the tractors, the upper free edge of the movable portion of each lateral fairing is arranged at the fairing height with respect to the top surface of the rear chassis part in accordance with the fifth-wheel height through the mounting arrangement.

8. A method for configuring the tractor of claim 1, comprising the steps of moving the movable portion of each of the lateral fairings with respect to the fixed portion through the mounting arrangement to arrange the upper free edge of the movable portion at the fairing height with respect to the top surface of the rear chassis part in accordance with the fifth-wheel height.

9. The tractor of claim 2, wherein the male mounting member is a rivet, a screw, a nut-bolt, or a clip.

* * * * *